FIG. 1

INVENTORS
JONATHAN B. FLEMING
MICHAEL PANICH
JAMES E. McEVOY
TREVOR FINK
BY AND
ATTORNEY

FIG. 2

INVENTORS
JONATHAN B. FLEMING
MICHAEL PANICH
JAMES E. McEVOY
TREVOR FINK

BY AND

ATTORNEY

Nov. 14, 1961   J. B. FLEMING ET AL   3,008,480
PNEUMATIC TRANSMITTER

Filed Sept. 9, 1958   6 Sheets-Sheet 3

INVENTORS
JONATHAN B. FLEMING
MICHAEL PANICH
BY AND JAMES E. McEVOY
TREVOR FINK

ATTORNEY

INVENTORS
JONATHAN B. FLEMING
MICHAEL PANICH
JAMES E. McEVOY
TREVOR FINK
BY AND
ATTORNEY

Nov. 14, 1961  J. B. FLEMING ET AL  3,008,480
PNEUMATIC TRANSMITTER

Filed Sept. 9, 1958  6 Sheets-Sheet 5

INVENTORS
JONATHAN B. FLEMING
MICHAEL PANICH
BY AND JAMES E. McEVOY
TREVOR FINK

*John F. Barber*
ATTORNEY 3,008,480
PNEUMATIC TRANSMITTER
Jonathan B. Fleming, South Euclid, Michael Panich, Willoughby, James E. McEvoy, South Euclid, and Trevor Fink, University Heights, Ohio, assignors to Bailey Meter Company, a corporation of Delaware
Filed Sept. 9, 1958, Ser. No. 759,946
22 Claims. (Cl. 137—85)

This invention relates to measuring devices and more particularly to pneumatic force balance measuring devices.

We have chosen to illustrate and describe our invention as embodied in a differential pressure transmitter of the force balance type effective to produce an output pneumatic pressure signal representative of a flow rate. However, as will become apparent to those skilled in the art, the invention is not limited in scope to this specific application, and the description of the invention in reference thereto is for purposes of illustration rather than limitation.

In the past it has been customary in force balance flow measuring apparatus to apply a differential pressure representative of a flow rate to a pressure sensitive element comprising a resilient diaphragm arranged to apply a force to and deflect a pivoted force balance beam. The beam is effective upon displacement thereof to vary the spacing between a nozzle-baffle fluid pressure couple which in turn causes a pneumatic amplifier to establish a pneumatic output pressure signal.

A pivoted restoring beam is generally positioned in parallel relationship with the force beam for applying a rebalancing force to the force beam sufficient to balance the initial unbalancing force. The amplifier output pressure is applied to a bellows or other expansible element engaging the restoring beam to establish the restoring force. With such structure the output pneumatic pressure signal increases until the force beam is in balance and about restored to its initial position. To enable adjustment of the output pressure range of the amplifier, an adjustable fulcrum is usually positioned on the restoring beam to provide an adjustable point of contact between the force beam and restoring beam which can be varied to change the moment arm of the restoring force.

In the customary construction, the force beam has one end thereof extending through a sealing means in a wall of a casing containing the differential pressure responsive element and the other end thereof extending into a housing containing the nozzle baffle couple, restoring beam, and restoring bellows. The sealing means in addition to providing the necessary seal for the casing provides a fulcrum on which the force beam pivots during the above described operation.

While force balance flow measuring devices of the type described above have performed their intended function, and have provided reasonably accurate indications of flow rates, such devices are subject to a number of limitations which in the past have limited their accuracy and effectiveness. One major disadvantage of the above described construction is the fact that the pressure within the casing containing the pressure sensitive element tends to distort the sealing means pivotally supporting the force beam by applying an end thrust on the force beam. This causes a distortion or displacement of the force beam along its longitudinal axis and the introduction of error into the system.

Another factor limiting the accuracy of prior art devices is the fact that it is difficult to maintain engagement of the restoring beam with the force balance beam at minimum or zero position. At these conditions minimum forces are applied to the force balance beam, and there is a tendency for the force beam to move out of engagement with the restoring beam thus affecting the operation of the system.

Another major factor is the construction of the adjustable fulcrum between the restoring beam and the force balance beam. The most common arrangement has been to externally thread the restoring beam and mount a rotatable internally threaded wheel thereon, the periphery of which is engageable with the force balance beam. With such a construction it is extremely difficult to adjust the position of the fulcrum externally of the housing. In addition, adjustment of the fulcrum results in excessive frictional wear on the surfaces.

Still another disadvantage of prior art systems is the structure of the diaphragm units which have been employed to sense the differential pressure representative of the flow rate. In the past, due to the structure and characteristics of the pneumatic amplifiers employed, it has been necessary to use either a fabric diaphragm or a corrugated metal diaphragm so as to obtain a satisfactory range of diaphragm movement over the range of variation of the flow rate. Fabric diaphragms have been found unsatisfactory due to the difficulty of adequately reinforcing their surfaces to prevent damage by excessive pressure conditions. The corrugated metal diaphragms eliminate many of the problems and disadvantages of the fabric diaphragms but are also undesirable since the corrugations are easily damaged and difficult to protect against excessive pressure conditions.

Another disadvantage of these prior art devices is the undesirable effect of temperature variations on the various parts. In the usual construction it is possible for thermal expansion to vary the biasing force of calibrating springs or vary the relative positions of the nozzle and baffle of the fluid pressure couple. This results in an error being introduced into the output signal.

Another disadvantage of prior art devices is the lack of flexibility or adaptability to the measurement of different variables. Such prior art transmitting devices are not easily convertible to the measurement of other variables such as a liquid level, pressure, temperature, speed and the like. In addition, it is often desired to use a square root extracting mechanism in connection with a flow measuring device to produce an output signal having a linear relationship with the flow rate. In most prior art constructions these conversions have been difficult and it is usually necessary to purchase a complete new unit.

It is a principal object of this invention to provide a pneumatic transmitting and measuring device of the force balance type of improved construction and possessing greater accuracy than prior art devices.

Another object of the invention is to provide a force balance transmitting device which is readily convertible from the measurement of one variable to the measurement of another variable.

Another object of the invention is to provide a force balance pneumatic transmitting device which may be readily equipped with a square root extracting mechanism.

Another object of the invention is to restrain a force balance beam against undesired displacement or distortion along its longitudinal axis.

Another object of the invention is to apply a biasing force to a force balance beam to insure contact of the beam with a restoring beam at minimum output signal conditions.

Another object of the invention is to provide a single means which both restrains a force balance beam against longitudinal axial distortion or movement and provides a biasing force to assure engagement of the beam with the restoring beam during minimum output signal conditions.

Still another object of the invention is to provide a differential pressure responsive unit employing flat metal diaphragm plates in combination with a force balance transmitting device having a reset amplifier.

Still another object of the invention is to substantially eliminate the effect of temperature variations on the accuracy of a force balance transmitting device.

Still another object of the invention is to provide a force balance transmitting device having a micrometer type range adjustment.

Other objects and advantages will become apparent from the following description taken in connection with accompanying drawings wherein.

Figure 1:
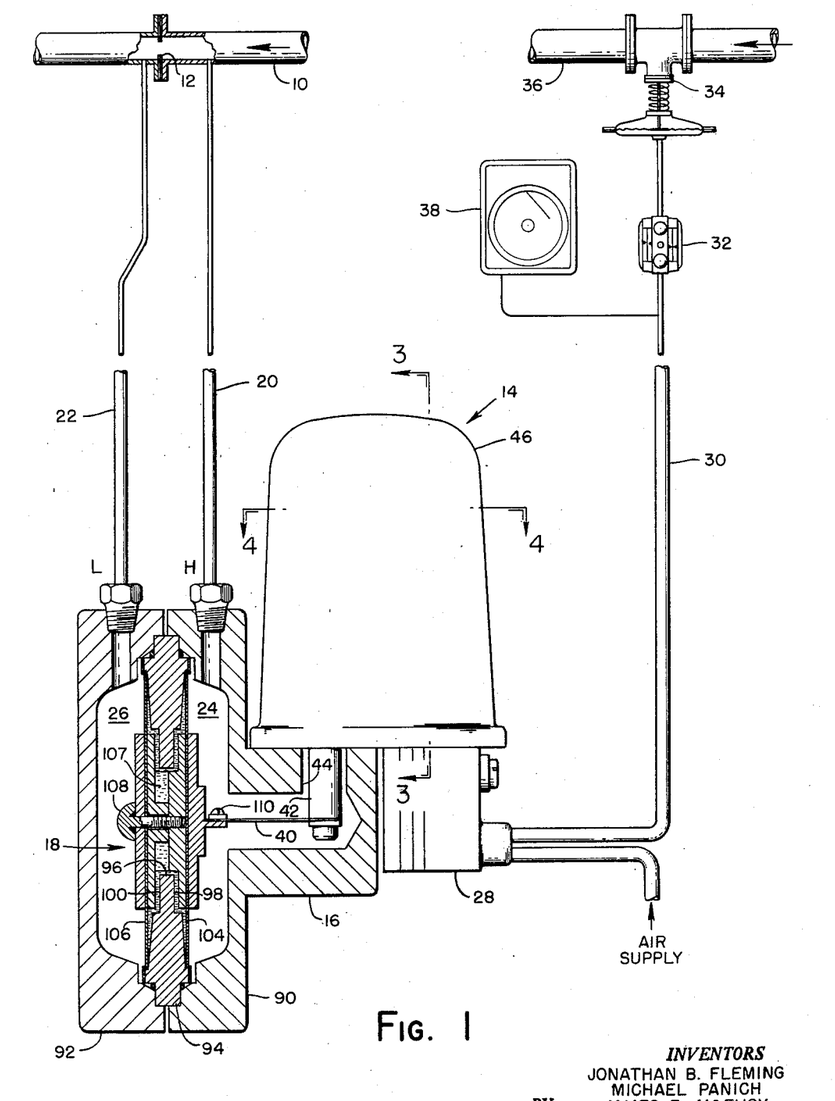
FIG. 1 is a somewhat schematic illustration of our invention incorporated in a flow measuring system.

Referring to FIG. 1 of the drawings, there is shown a fluid conduit 10 through which fluid flows in the direction indicated by the arrow. The conduit 10 contains a primary measuring element comprising in this case an orifice plate 12 across which a differential pressure proportional to the flow rate is produced.

A transmitting device generally indicated at 14 constructed in accordance with the teaching of the invention comprises a casing 16 having a pressure sensitive metal diaphragm unit 18 mounted therein. Pipes 20, 22 serve to impress the pressure differential established by the primary element 12 across the diaphragm unit 18. More particularly, pipe 20 connects the high pressure side of the element 12 with a pressure chamber 24 on the right side of the diaphragm unit 18 while pipe 22 connects the low pressure side of the element 12 with a pressure chamber 26 on the opposite side of the diaphragm unit 18. With this arrangement an increase in the flow rate through conduit 10 will result in deflection of diaphragm unit 18 to the left as viewed in FIG. 1 while a decrease in the flow rate will be reflected in movement of the diaphragm unit 18 to the right.

The transmitting device 14 as will presently be described in detail is effective in response to the described movements of the diaphragm unit 18 to actuate a force balance system and cause a pneumatic amplifier 28 to produce a pneumatic variable output control pressure having reset characteristics in a conduit 30 representative of the flow rate in conduit 10. The output control pressure in conduit 30 may be utilized for indicating and/or control purposes. In the arrangement illustrated, the signal in conduit 30 is compared with a set point signal in a selector station 32 of the type disclosed in Dickey et al. Patent 2,729,222 and utilized to pneumatically actuate a control valve 34 for controlling the flow in a conduit 36 which may be an extention of the conduit 10 or form part of a separate flow system. A recorder 38 is illustrated as connected to the conduit 30 for manifesting the instantaneous value of the flow rate and producing a continuous record thereof.

The control system illustrated in FIG. 1 of this application and the various components employed such as the primary element 12, selector station 32, recorder 38 and valve 34 for accomplishing such control are well known to those skilled in the art, it being sufficient to say that the transmitting device 14 is effective to produce an output control pressure in conduit 30 representative of the flow rate in conduit 10, the output control pressure being utilized to provide an indication of the flow rate in recorder 38 and to provide control of the flow rate in conduit 36 through the agency of valve 34.

Figure 2:
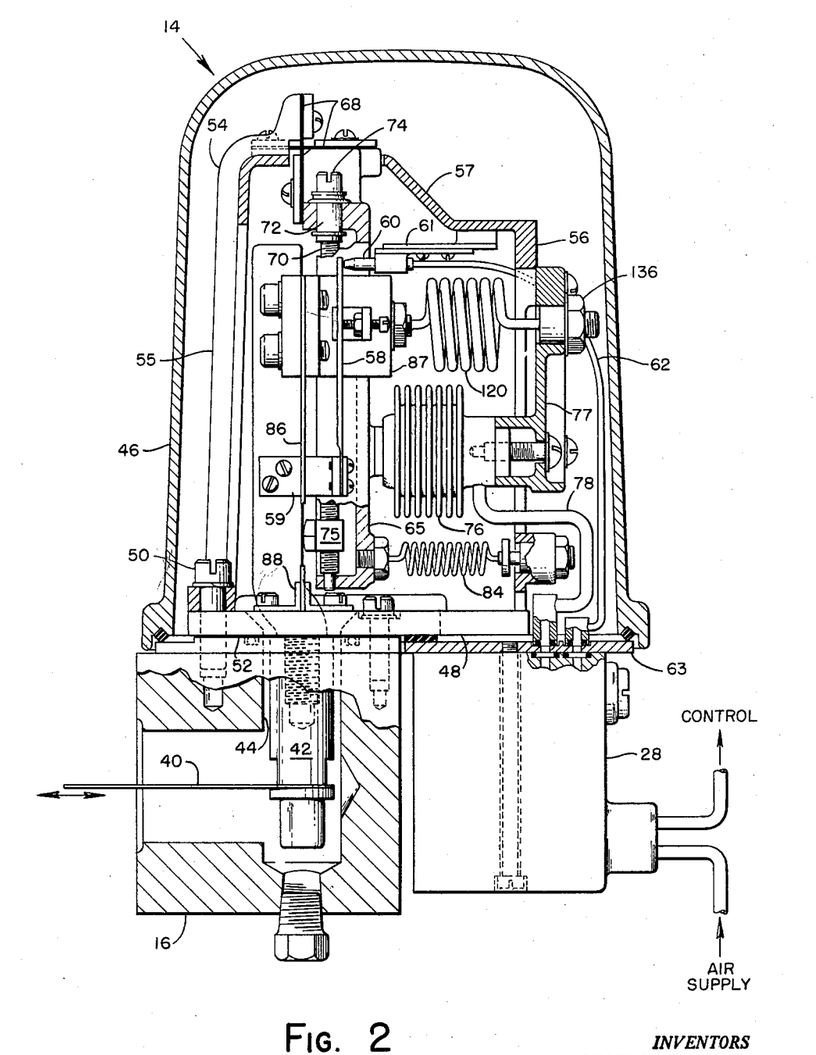
FIG. 2 is a longitudinal partial sectional view of the transmitting device illustrated in FIG. 1.

Referring now to FIG. 2 of the drawings, which illustrates the internal structure of the transmitting device 14, the medial portion of diaphragm unit 18 is connected by a link 40 to one end of a pivoted force balance beam indicated generally by the reference numeral 42. The beam 42 extends longitudinally through a bore 44 provided in the upper portion of the casing 16 and within a housing or cover 46 secured to the upper end of the casing 16. A supporting plate 48 shown more clearly in FIG. 6 is clamped to the upper face of the casing 16 by means of screws 50 and is provided with a suitable counterbored opening 51 continuous with the bore 44 in the casing 16.

Sealing means comprising a thin metal diaphragm 52 is clamped between the supporting plate 48 and the upper surface of the casing 16 to seal the bore 44 and to provide a flexure or pivotal support for the force balance beam 42. More particularly, the force balance beam 42 comprises upper and lower portions extending on opposite sides of the diaphragm 52, screwed together and clamping the diaphragm 52. With this arrangement, the force balance beam 42 is supported by the diaphragm 52 which will flex to permit pivotal movement of the force balance beam 42 and additionally provides a tight pressure seal for the interior of the casing 16. Thus upon deflection of the diaphragm unit 18 as described in connection with FIG. 1 a force will be applied through link 40 to the lower end of the force balance beam 42 tending to cause pivotal movement thereof on the sealing diaphragm 52.

Figures 6, 8, 9:
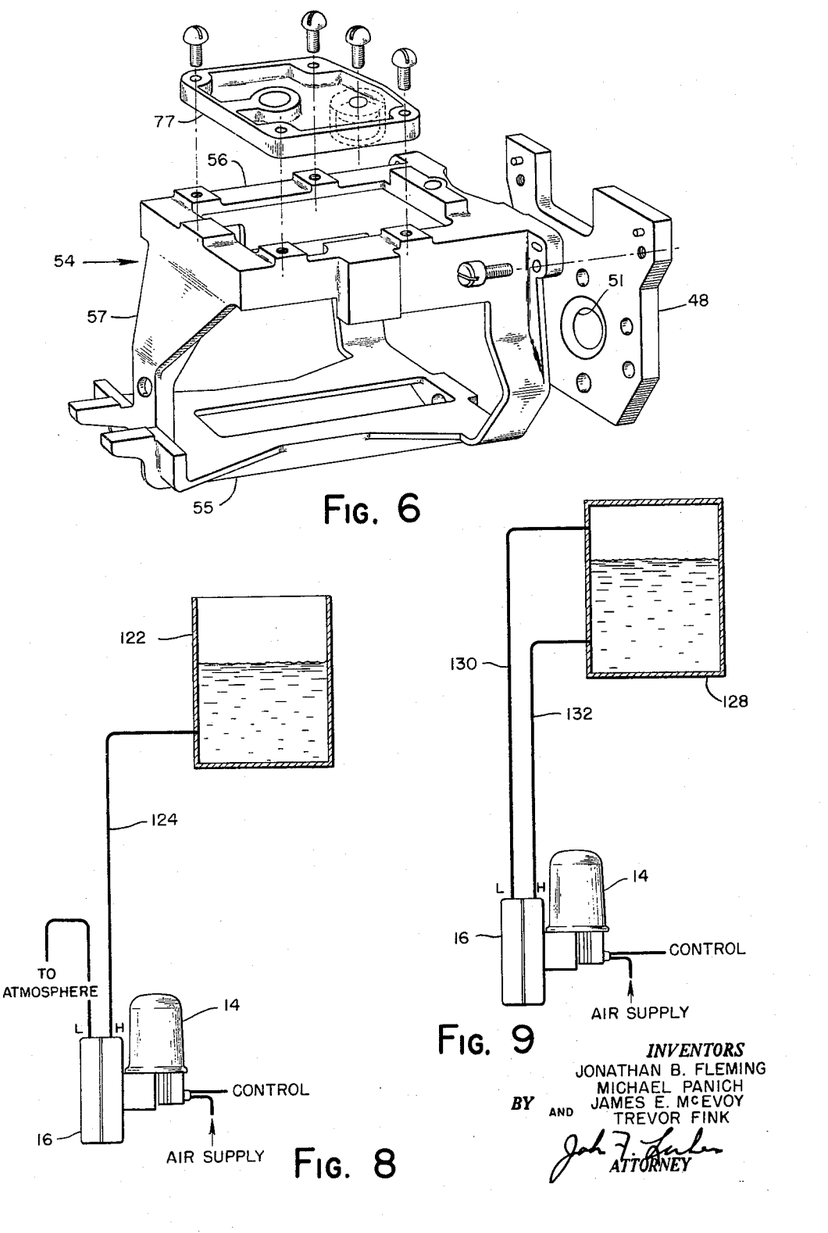
FIG. 6 is an exploded perspective view showing the mounting of several of the parts illustrated in FIG. 2.
FIG. 8 is a schematic illustration of the transmitting device adapted for measuring the level in an open tank.
FIG. 9 is a schematic illustration of the transmitting device adapted for measuring the level in a closed, pressurized tank.

The upper end of the force balance beam 42 extends into the interior of the hollow mechanism frame 54 clamped to the upper side of the plate 48 as illustrated more clearly in FIG. 6. In general, the frame 54 comprises a pair of vertical supporting walls 55, 56 and an upper end wall 57 which will hereinafter be described in more detail in connection with the parts mounted thereon. The bottom portion of the frame is provided with a pair of spaced flanges on the left side thereof and a single flange on the right side thereof through which suitable screws extend to securely clamp the frame to the casing 16 against the upper surface of supporting plate 48. As will later be described the particular structure of the supporting plate 48 and frame 54 is effective to provide temperature compensation.

The upper end of the force balance beam 42 is operative upon pivotal movement thereof to vary the spacing between a nozzle baffle fluid pressure couple which is effective to control the output control pressure of pneumatic amplifier 28. More particularly, a flexible baffle 58 is mounted at one end on the medial portion of the beam 42 by means of a bracket 59 and has the other end thereof positioned in close proximity to the discharge end of a nozzle 60 rigidly mounted on a bracket 61 fixed to and extending from the supporting wall 56. The nozzle 60, by a pipe 62 receives a suitable source of fluid pressure within the amplifier 28 and is also in communication with an expansible chamber within the amplifier 28. Upon pivotal movement of the force balance beam 42 in response to deflection of the diaphragm unit 18, the flexible baffle 58 will be deflected relative to the end of the nozzle 60 to vary the pressure within pipe 62 and the expansible chamber within pneumatic amplifier 28. The amplifier 28 is sensitive to this increase or decrease in pressure in pipe 62 to establish a corresponding amplified output control pressure in conduit 30, pipe 78 and restoring bellows 76.

Figure 3:
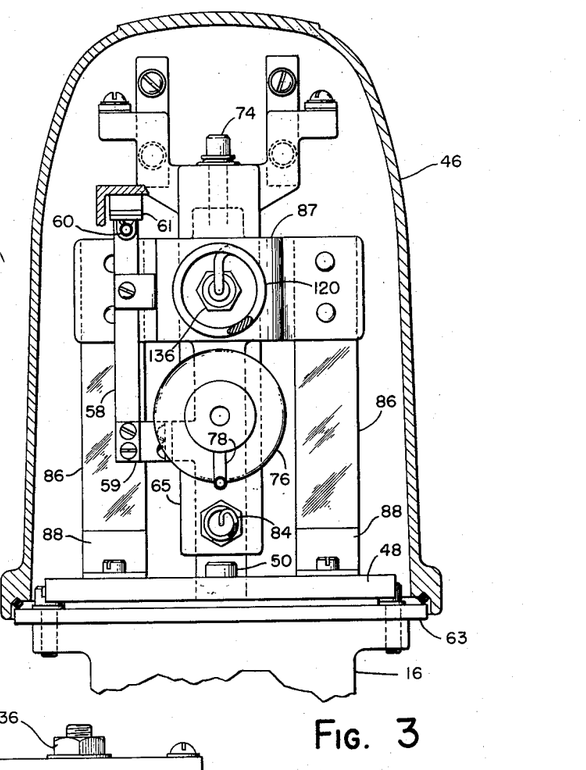
FIG. 3 is a section taken along the line 3—3 of FIG. 1.

The amplifier 28 is of the reset type such as that disclosed and claimed in copending application Serial No. 652,477, filed April 12, 1957 by Bruce H. Baldridge, which issued March 14, 1961, as Patent No. 2,974,674, and reference is made to said disclosure for a complete description of the structure and operation of such a pneumatic amplifying device. The amplifier 28 is mounted on the bottom of a supporting plate 63 shown more clearly in FIGS. 3 and 5. The plate 63 is provided with a pair of extended mounting arms which are attached by screws to the upper surface of casing 16 on opposite sides of the frame 54. The supporting plate 63 also provides support for the cover 46 which encloses the force balance beam 42, and associated parts.

The magnitude of the output control signal in conduit 30 is determined by the magnitude of a restoring force necessary to restore the beam 42 to its original position following a deflection therefrom. To this end a restoring beam 65 is positioned in parallel relationship to the force balance beam 42. One end of the restoring beam 65 is pivotally mounted on the end wall 57 of frame 54 by means of hinge spring 68, while the other free end terminates adjacent the upper surface of the supporting plate 48.

The restoring beam 65 is generally channel shaped having an open side wall adjacent to the force balance beam 42. A threaded shaft 70 extends longitudinally through the channel shaped structure and has its opposite ends rotatably mounted in the end walls of the restoring beam. The lower end of the shaft 70 is supported in a suitable opening in the lower end wall while the upper end extends through an opening in the opposite end wall and is provided with bushing 72 for inhibiting axial movement of the shaft. The upper end of the shaft 70 is slotted at 74 to facilitate rotation thereof. An adjustable fulcrum 75 is threaded on the shaft 70 for movement axially of the shaft upon rotation thereof. The fulcrum 75 is adapted to engage the force balance beam 42 to apply a restoring force thereto upon application of a force to the restoring beam 65. Rotation of the shaft 70 serves to adjust the point of application of this restoring force and as will later be apparent the range of the output control signal. The particular mounting of the threaded shaft 70 and fulcrum 75 provides a highly efficient micrometer adjustment which reduces friction between the parts to a minimum during the range adjustment to thus reduce the tendency for frictional wear.

A variable force is applied to the restoring beam 65 and thus to the force balance beam 42 by means of an expansible bellows 76 which is mounted at one end on a plate 77 secured to the supporting wall 56 by screws as illustrated in FIG. 6 and has its free end engaging the restoring beam 65. The interior of the bellows 76 receives the output control pressure by way of conduit 78 to thus apply a proportional restoring force to the beam 65.

A calibrating spring 84 is detachably mounted between the supporting wall 56 and the lower end of restoring beam 65 and is provided with tension or compression adjustability to permit adjustment of the zero flowrate output control signal of the amplifier 28. Most modern pneumatic control systems operate in a 3-15 p.s.i. or 3-27 p.s.i. signal range. Therefore, for most flow measuring applications the spring 84 is adjusted to produce a 3 p.s.i. output control signal at zero flow rate.

In operation of the transmitting device 14 as thus far described, if the flow rate through conduit 10 should increase, the diaphragm unit 18 will be deflected to the left as viewed in FIG. 1 and clockwise pivotal movement of the force beam 42 will occur as viewed in FIG. 2. This movement is effective to decrease the spacing between nozzle 60 and baffle 58 to effect an increase in pressure in conduit 62 thereby resulting in an increase in the output control signal of amplifier 28. The bellows 76 will respond to the increase in output control pressure to apply a greater force to the restoring beam 65 which in turn applies a greater restoring force to the force beam 42 at the point of the adjustable fulcrum 75. When the moment produced by the restoring force on the beam 42 equals the moment produced by the diaphragm unit 18, the beam 42 will assume its original position and the system will come to rest at the new output pressure.

It will be apparent that the range of variation of the output pressure with variations in the flow rate may be readily adjusted by rotation of shaft 70 to vary the moment arm of the restoring force.

It is to be noted that the pressure within chamber 24 is applied to the underside of sealing diaphragm 52 thus producing an axial thrust on the force balance beam. It is apparent that if the beam 42 is permitted to move under this thrust an error will be introduced into the output control signal.

Figure 4:
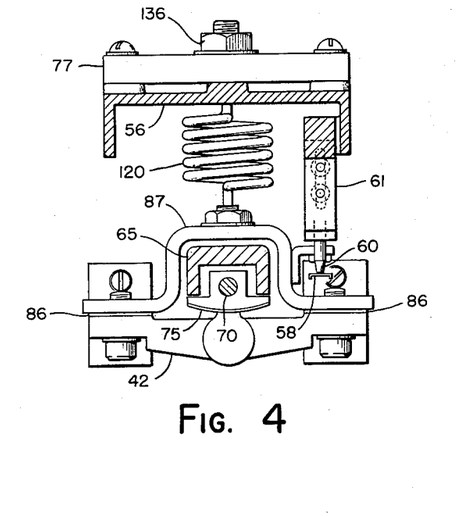
FIG. 4 is a section taken along the line 4—4 of FIG. 1.

To prevent axial displacement of the force balance beam 42 because of such axial thrust, a pair of flexure strips 86 are provided. The flexure strips 86 are positioned on opposite sides of the beam 42 in parallel relationship therewith. The strips each comprise a thin flexible strip of metal and have the upper ends thereof clamped by screws between the spaced flanged ends of a U-shaped clamp member 87 (shown more clearly in FIG. 4) and complemental flanges formed on the force balance beam 42. The lower ends of the flexure strips 86 are fixed to the frame 54 by clamps 88. With this supporting arrangement, the flexure strips 86 are thus placed under tension by the axial thrust and inhibit axial displacement of the beam 42.

As previously mentioned there is a tendency for the force balance beam 42 to move out of engagement with the adjustable fulcrum 75 at zero flow rate conditions. The reason for this effect will become apparent from examining the forces exerted by the various components. When the flow rate is zero the pressures on opposite sides of the diaphragm unit 18 are equal and therefore no force is applied to the lower end of the force balance beam 42. However, at this condition it is desired to produce a 3 p.s.i. output pressure in conduit 30 in accordance with the standard signal ranges employed in most modern pneumatic control systems. To accomplish this the spring 84 is adjusted to apply a force to the lower end of the restoring beam 65 which will offset the force applied to the restoring beam by the 3 p.s.i. signal applied to the restoring bellows 76. With the spring and bellows forces on the restoring beam 65 thus balanced, there is no force applied to the force balance beam 42, and it will be apparent that movement of the force balance beam 42 out of engagement with the fulcrum 75 is possible.

Figure 7:
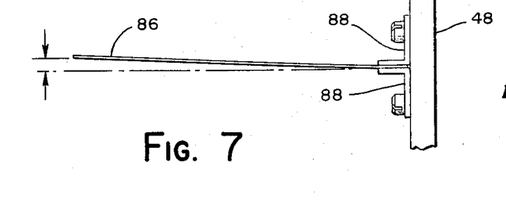
FIG. 7 is an enlarged detail of a part illustrated in FIG. 2.

To eliminate this undesired positioning of the force balance beam 42 at zero flow rate conditions, the flexure strips 86, 86 are provided with an inherent bias which serves to maintain contact of the force balance beam 42 with the adjustable fulcrum 75. Referring to FIG. 7 which is a detail of the flexure strips 86, 86 before assembly, this result will become apparent. As illustrated in FIG. 7 each flexure strip 86 is bent at its lower end adjacent clamp 88 prior to assembly to displace the upper end thereof relative to the axis of the force balance beam by a slight amount. When the flexure strips 86, 86 are installed, however, they have a straight configuration when the force balance beam 42 is in its normal balanced position. This causes the flexure strips 86, 86 to exert a slight biasing force on the beam 42 tending to cause clockwise pivotal movement thereof about the diaphragm 52. Thus, the initial bend of the flexure strips 86, 86 establishes an inherent bias which tends to bias the force balance beam toward engagement with the adjustable fulcrum 75.

It was hereinbefore stated that the calibrating spring 84 was normally adjusted to apply a force to the restoring beam 65 equal and opposite to the force produced by the restoring bellows 76 at a 3 p.s.i. output signal. However, since the flexure strips 86, 86 provide an inherent bias which acts in opposition to the force of bellows 76, it is necessary to adjust the calibrating spring 84 until the combined forces of the flexure strips 86, 86 and spring 84 are equal to the 3 p.s.i. force of the restoring bellows 76. By properly sizing the flexure strips 86, 86, an inherent bias can be obtained which produces a moment on the force balance beam 42 substantially equal to the moment produced by the restoring bellows 76 at 3 p.s.i. output pressure. If the flexure strips are so sized to achieve this condition, the biasing force of the calibrating spring 84 need only be adjusted to compensate for very slight differences in the two moments.

From the above it will be apparent that the flexure strips 86, 86 not only serve to restrain the force balance beam 42 against axial movement but also provide a biasing force which assures contact or engagement of the force balance beam 42 with the adjustable fulcrum 75 at zero flow conditions. Thus, the flexure strips 86 accomplish a double purpose with minimum parts and cost.

Another important feature of the transmitting device 14 is the location of the various pivot points for the parts. It is to be noted that the force balance beam 42 is of offset construction, the portion above the diaphragm 52 defining a longitudinal axis offset from the axis of the lower portion thereof whereby the right hand edge of said upper portion falls on an extension of the longitudinal axis of the lower portion. The flexure strips 86 are positioned in the same plane as the longitudinal axis of the lower portion whereby the restraining force acts in opposition to the thrust on the force beam along the axis of the lower portion of the beam. With this arrangement there is no tendency for the restraining force of the flexure strips 86 to produce a moment on the force balance beam 42 other than that produced by the inherent bias previously described.

The operation of the transmitting device 14 is further improved by the fact that the pivot axis established by hinge springs 68 for the restoring beam is in the plane of the flexure strips 86 and longitudinal axis of the lower portion of the force balance beam 42. In addition, due to the offset construction of the force balance beam 42 the point of engagement of the adjustable fulcrum 75 and force balance beam 42 under balanced conditions lies in this same plane. It will be apparent that due to the pivotal mounting of the restoring beam 65, the adjustable fulcrum 75 will move in an arc and thus undergo a slight change in vertical position upon movement of the restoring beam. Such arcuate movement of the adjustable fulcrum 75 would obviously result in some vertical shifting of the point of engagement with the force balance beam 42. This effect is minimized in the construction illustrated in FIG. 2 since, due to the location of the pivot axis for the restoring beam, the adjustable fulcrum 75 is positioned in the lowermost point of its arcuate path in the balanced position of the force balance beam 42. Thus, there is only very slight vertical positioning of the fulcrum 75.

It will now be apparent that the provision of the flexure strips 86 and the particular offset construction of the force balance beam 42 combined with the location of the various pivot axes produces a highly efficient and accurate force balance transmitting device possessing advantages lacking in prior art devices.

Another feature of the invention is the temperature compensation inherent in the particular method of mounting the various parts. It will be apparent that if the position of the nozzle 60 should shift relative to the vane 58 an error will be introduced into the system. Upon an increase in temperature, expansion of the supporting plate 48 will occur causing that portion thereof to the right of its bore to shift to the right carrying the vertical wall 56 and upper end wall 57 of frame 54 therewith. Normally such movement would displace the nozzle 58 to the right to introduce an error into the output signal.

In the construction shown however, the nozzle 60 is spaced from the supporting wall 56 of the frame 54 by a horizontal length of material equal to the horizontal length of the material of the supporting plate subjected to thermal expansion and effecting the position of nozzle 60. The supporting plate 48, and bracket 61 are of material having equal thermal expansion coefficients. Thus, upon expansion of the supporting plate 48 in response to the temperature increase, expansion of an equal compensatory length of material between the nozzle 60 and wall 56 will occur. The expansion of the two sections will be in opposite directions and accordingly the position of the nozzle 60 will not change during temperature variations.

A similar compensatory action takes place in connection with the spring 84 and a suppression spring 120 later to be described. More particularly, the movement of the supporting wall 56 to the right in response to an increase in temperature as described above will tend to displace the right hand end of the spring 84 to vary the spring force. However, in this case also the length of the spring 84 is substantially equal to that of the plate 48 subjected to thermal expansion, and the length of the spring 84 will increase to compensate for the expansion of plate 48 to thereby maintain the force of the spring substantially constant.

Referring now to the novel construction of the diaphragm unit 18, as shown in FIG. 1 the casing 16 is formed in two parts 90, 92 between which is clamped a circular back-up plate 94. The back-up plate 94 is provided with a centrally located bore 96 and counterbored recesses 98, 100. A pair of thin flat metal diaphragms 104, 106 of stainless steel or other suitable material are fixed such as by welding to peripheral shoulders of the back-up plate 94 on opposite sides thereof to define a sealed interior space.

Each of the diaphragms 104, 106 is provided with a pair of reinforcing plates which are secured together as a unit with a spacer 107, integral with the interior plate of diaphragm 106 by screw 108, each plate being welded to its associated diaphragm. The exterior plate of diaphragm 104 has linkage 40 connected thereto by screw 110. The interior plates are formed of shape complemental to that of recesses 98, 100 respectively to be received thereby. The interior space of the diaphragm unit 18 is filled with a suitable non-compressible liquid which serves to reinforce the diaphragm plates 104, 106 when they are out of engagement with the back-up plate 94 and at the same time to provide a dampening effect upon sudden pressure changes.

In operation, the diaphragm plates 104, 106 and associated reinforcing plates are movable as a unit relative to the back-up plate 94 upon a change in the pressure difference between chamber 24 and 26, the liquid filling the unit reinforcing the diaphragms to prevent undesired bending thereof. If the pressure differential should become excessive the diaphragm 104 will move into engagement with the back-up plate 94, and its interior reinforcing plate will engage the bottom of recess 98 whereupon no further movement of the unit can occur preventing any damage to the diaphragms by the excessive pressure condition.

It will be apparent from the above that the provision of a single back-up plate 94 intermediate the two diaphragms 104, 106, provides protection against excessive movement of the unit 18 in either direction. In addition, the filling liquid reinforces the diaphragm plates when the same are out of engagement with the back-up plate 94. Thus, the diaphragm unit 18 is a simple compact assembly unaffected by excessive pressure conditions or sudden pressure surges within the casing 16.

In prior art transmitting devices of this nature, it is customary to employ a fabric or corrugated metal diaphragm to obtain the necessary range of movement of the force balance beam for the range of flow rates encountered. The diaphragm plates 104, 106 being flat are movable through a much smaller range than the prior art corrugated metal or rubber diaphragms. But this limited range of movement is sufficient due to the provision of the reset amplifier 28. Thus, by employing the combination of a reset amplifier and a diaphragm unit employing flat diaphragm plates, we have eliminated the problems of reinforcing the prior art fabric and corrugated metal diaphragms and at the same time produced an inexpensive and more accurate transmitting device.

The transmitting device 14 can be adapted for measurements requiring a large initial biasing force such as the measurement of a variable level in either a closed or open tank by the provision of a suppression spring 120 mounted between supporting plate 77 and the U-shaped clamp member 87 which supplements the spring 84.

Referring to FIG. 8 which illustrates the transmitting device 14 utilized to measure level in an open tank 122, the pressure chamber 24 is connected by conduit 124 to the bottom of the tank while the pressure chamber 26 is open to the atmosphere. Since the fluid in the tank is at atmospheric pressure, a pressure differential is thus applied to the diaphragm unit 18 equal to the difference in elevation between tank 122 and transmitting device 14 plus the height of liquid in tank 122. It is accordingly necessary to establish a force to counterbalance the pressure head due to the difference in elevation. This is accomplished by adjusting spring 120 to be in compression so that it will apply a suppressive force directly to the force balance beam 42 which counteracts the force applied to the beam by the pressure head due to the difference in elevation. With such suppression, the range of the transmitting device 14 can be then adjusted to provide full range variation of the output signal for the range of variation of the liquid level in tank 122.

FIG. 9 illustrates schematically the application of the transmitting device 14 to the measurement of level in a closed tank 128. In this case the pressure chamber 26 is connected by conduit 130 to the tank 128 at or above the maximum liquid level and the pressure chamber 24 is connected by a conduit 132 to the tank 128 at or below the minimum liquid level. The conduit 130 is filled and maintained full of liquid by a suitable means such as a bleed system or in the case of a condensible vapor by means of a condenser as will be readily understood by those familiar with the art. A constant pressure is thus applied to the chamber 26. The pressure within chamber 24 will vary inversely with level. As a result a differential pressure is applied to the diaphragm unit 18 equal to the difference of the two pressures or proportional to the level within tank 128. Since in this case the higher pressure is applied to the pressure chamber 26 the spring 120 is adjusted to be in tension so that at maximum level corresponding to minimum differential the output control pressure is maximum i.e. 15 or 27 p.s.i. as the case may be. As the level decreases the differential pressure will increase proportionately causing a proportionate decrease in output control pressure.

The spring 120 has one end detachably connected to the medial portion of the U-shaped clamp 87 which extends around the restoring beam 65 while the other end thereof is detachably connected to the plate 77 by means of bolt means 136. The particular configuration of the U-shaped clamp 87 permits the spring 120 to be physically mounted to the right of the restoring beam 65 while the biasing force thereof is applied directly to the force balance beam 42 resulting in a compact, highly efficient structure. Due to the detachable mounting of the spring 120, it may be readily installed or removed to adapt the transmitting device 14 to any type of service required.

In the various applications of the transmitting device 14 thus far described, an output control signal is produced which has a linear relationship with the pressure differential applied to the diaphragm unit 18. As is well known, however, in the case of flow measurement the pressure differential varies as the square of the flow rate. As a result, the transmitting device 14 as illustrated in FIG. 2 will produce an output signal having a non-linear relationship with the flow rate in conduit 10. Due to the disadvantage of employing this non-linear signal for control purposes in many applications, it is often desired to provide a means for extracting the square root of the transmitter output control pressure to provide a final control signal which has a linear relationship with the flow rate.

Figure 10:
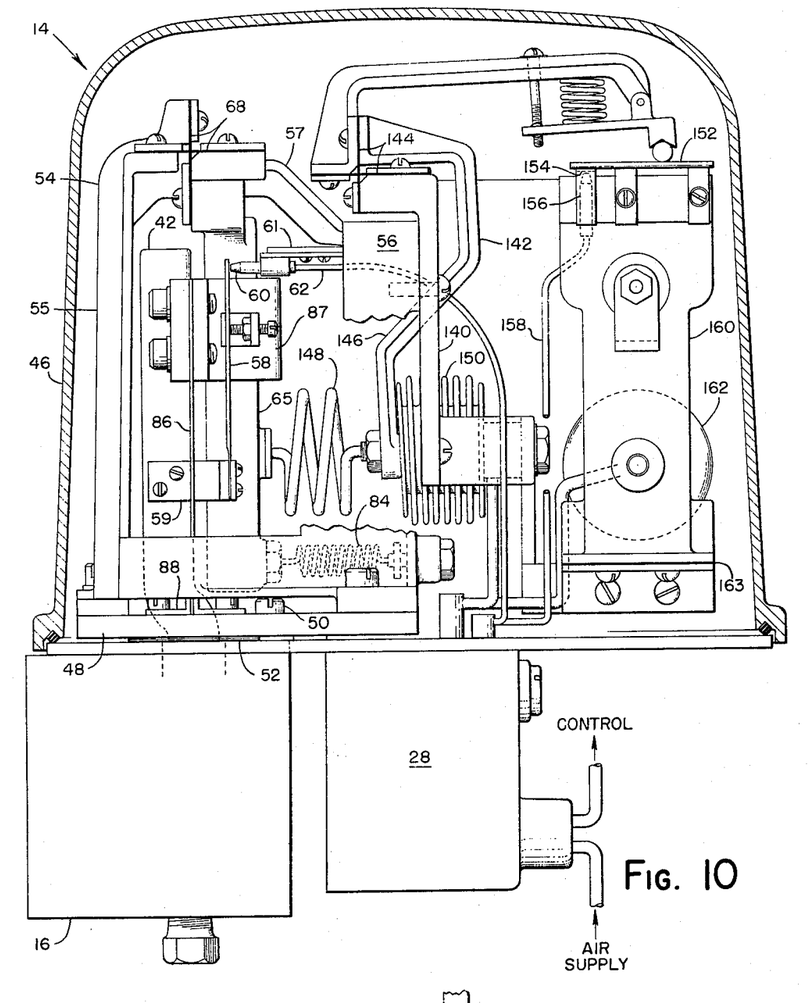
FIG. 10 is a partial sectional view similar to FIG. 2 illustrating the addition of a square root extracting mechanism to the structure illustrated in FIG. 2.

In modifying the construction shown in FIG. 2 to provide a final control pressure varying in linear relation to flow rate, we prefer to make use of the square root extracting mechanism illustrated and described in copending application Serial No. 729,943, filed April 21, 1958 by Jack F. Shannon, which issued May 30, 1961, as Patent No. 2,986,151, to which reference may be made for a more complete description. Referring to FIG. 10 of the drawings, a motion balance square root extracting mechanism is added to the structure illustrated in FIG. 2 to provide the desired linear output signal. More particularly, the mounting plate 77 and bellows 76 illustrated in FIG. 2 are detached as a unit and replaced by a mounting bracket 140 which is clamped to the supporting wall 56 by the same screws as the plate 77.

A generally L-shaped lever 142 is pivotally mounted on the bracket 140 by means of hinge springs 144 and is provided with an offset portion 146 extending through an elongated opening in one wall of the bracket 140 for attachment to the movable end of bellows 150 connected to the restoring beam 65 by a spring 148. The bellows 150 is mounted on the bracket 140 and is in communication with the output control pressure of pneumatic amplifier 28. With this arrangement, the output control pressure of pneumatic amplifier 28 is applied to the bellows to position the lever 146 and simultaneously apply a variable restoring force to the restoring beam 65 through spring 148. Thus, the position of lever 146 is dependent on and proportional to the restoring force required to maintain the restoring beam 65 in the neutral or null position.

The above described positioning of the lever 142 is utilized as the input motion to a motion balance system. More particularly, the other free end of the lever 142 engages a rod 152 spring mounted on a lever 160. Vertical movement of rod 152 positions a flexible baffle 154 relative to the discharge end of a nozzle 156, both mounted on the lever 160. The nozzle 156 is connected by conduit 158 to a second pneumatic amplifier 157 (FIG. 11) which is identical in structure and function to the amplifier 28, the second amplifier being responsive to pressure variations in conduit 158 to establish a final output control pressure.

The lever 160 is pivotally mounted on an extension of mounting bracket 140 by hinge springs 163. An expansible bellows 162 in communication with the final output control pressure of the second amplifier 157 positions the lever 160 to restore the original spacing of the nozzle 156 and baffle 154 after displacement therefrom. With the arrangement shown in FIG. 10 the final output control pressure of the amplifier 157 would be connected to the conduit 30 illustrated in FIG. 1 while the output control pressure of amplifier 28 is utilized only to effect expansion of the bellows 150.

Due to the arrangement of the pivot axis of the levers 146, 160 a cosine relationship between the motion of lever 146 and motion of lever 160 is achieved resulting in a final output control pressure from the amplifier 157 having a substantially square root relationship with the motion of the lever 146 and hence having a linear relationship with the measured flow rate.

The addition of the square root extracting mechanism illustrated in FIG. 10 to the transmitting device 14 is a very simple procedure. It is only necessary to remove the cover 46 and detach the mounting plate 77 and bellows 76 as a unit by loosening the clamping screws for plate 77. Following this the supporting plate 140 and the square root extracting mechanism may be attached as a unit by the same screws which clamped the plate 77 to the frame 54. Upon clamping of the plate 140 in the position illustrated in FIG. 10, the square root extracting mechanism is in an operative position with respect to the restoring beam 65 and force balance beam 42.

Figure 5:
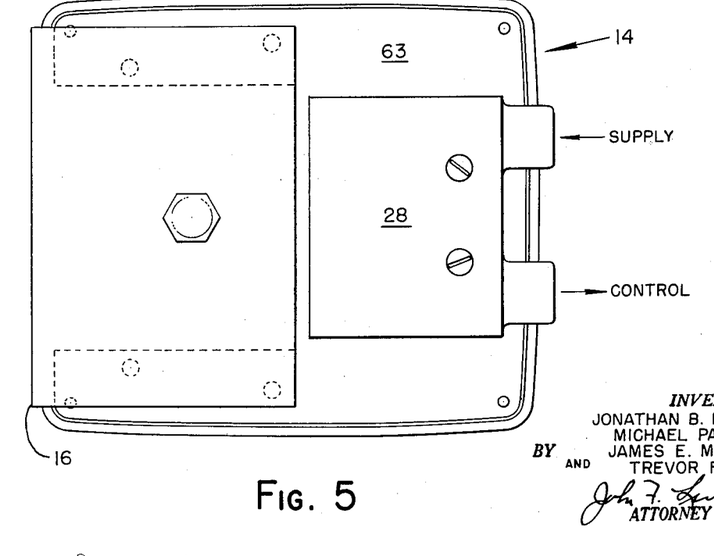
FIG. 5 is a bottom view of the transmitting device illustrated in FIG. 1.
Figure 11:
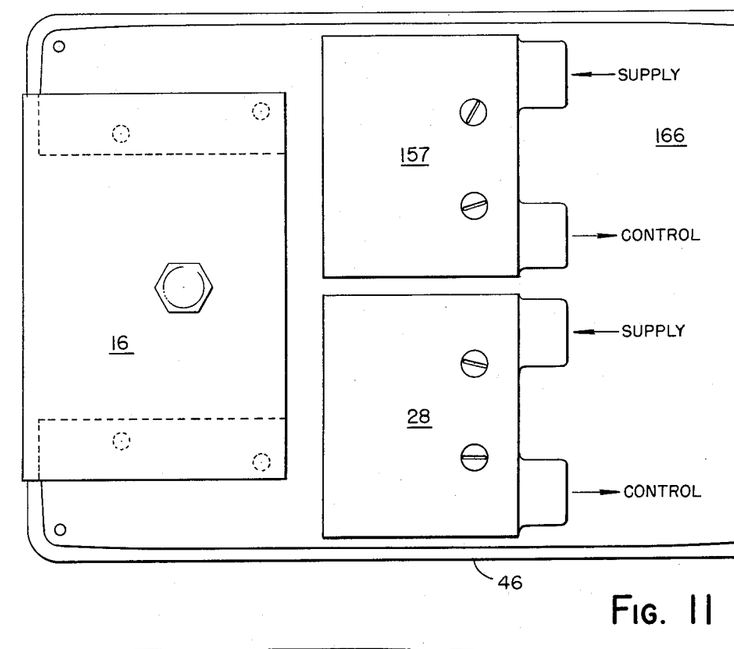
FIG. 11 is a bottom view of the modified transmitting device illustrated in FIG. 10.

The plate 63 illustrated in FIG. 5 is also removed and replaced by a larger plate 166 which is illustrated in FIG. 11. The pneumatic amplifiers 28, 157 are mounted in side by side relationship on the larger plate 166 in the manner illustrated in FIG. 11. The larger cover illustrated in FIG. 10 is then attached to the plate 166 in the same manner as the cover 46 illustrated in FIG. 2.

It will be apparent that the addition of the square root extracting unit is a relatively simple matter and that the conversion can be accomplished quickly in the field by unskilled personnel. Thus, the transmitting device possesses considerable flexibility and represents a considerable advance over the prior art.

While several embodiments of the invention have been herein shown and described, it will be apparent to those skilled in the art that many changes may be made in the construction and arrangement of parts without departing from the scope of the invention as defined in the appended claims.

We claim:

1. A transmitting device, comprising, a casing having a chamber therein for fluid under pressure and having an opening in the wall thereof, a movable beam extending through said opening, sealing means for sealing said opening and providing a pivotal support for said beam, means responsive to the pressure in said casing for applying a pivoting force to said beam proportional to the magnitude of a variable, means responsive to the pivotal displacement of said beam for establishing an output signal, means responsive to said output signal for applying a restoring force to said beam, and means connected between said beam and a fixed support for inhibiting axial movement of said beam under the influence of the pressure within said casing and for biasing said beam into engagement with said output signal responsive means.

2. A transmitting device comprising, a pivotal force balance beam, a yieldable pivotal support for said beam, means responsive to the magnitude of a variable for effecting pivotal movement of said beam on said support, means responsive to the pivotal displacement of said beam for establishing an output signal having a predetermined minimum value at zero magnitude of the variable, means responsive to said output signal for applying a restoring force to said beam, and means connected between said beam and a fixed support for applying an axial force to said beam to inhibit axial movement thereof relative to said pivotal support and to apply a biasing force to said beam substantially equal to and opposite to the force of said output signal responsive means at said minimum value of said output signal.

3. A transmitting device as claimed in claim 2 wherein said inhibiting means comprise a pair of flexure strips connected between one end of said beam and said fixed support, said flexure strips having an inherent bias which provides said biasing force.

4. In a transmitting device, the combination comprising, a supporting member having an opening therein, a movable beam extending through said opening and pivoted therein, means for applying a force to said beam in a predetermined range of magnitudes to effect pivotal movement thereof relative to said member, said means having a predetermined minimum force, and at least one flexure strip extending between one end of said beam and said member for inhibiting axial movement of said beam relative to said supporting wall, said flexure strip having an inherent bias for applying a biasing force to said beam equal to and opposite to the minimum force of said last named means.

5. A transmitting device comprising, a casing, a pressure sensitive diaphragm unit mounted in said casing, means for applying a pressure differential across said diaphragm unit representative of a flow rate, sealing means closing one end of said casing, a force balance beam pivoted on said sealing means and having one end extending into said casing for operative connection to said diaphragm unit to be deflected thereby, the other end of said force balance beam extending exteriorly of said casing, a nozzle and baffle fluid pressure couple cooperative with the exterior end of said force balance beam to undergo a variation in output upon deflection of said beam, means responsive to the output of said fluid pressure couple to establish a pneumatic output signal having a predetermined minimum value when the pressure differential is zero and a predetermined maximum value, an expansible element responsive to said output signal to apply a restoring force to said force balance beam, and a pair of flexure strips connected between the exterior end of said force balance beam and said casing for inhibiting axial movement of said beam in response to the pressure within said casing and for applying a biasing force to said beam equal to and opposite of the force exerted by said expansible element at said minimum value of said output signal.

6. A transmitting device as claimed in claim 5 wherein said flexure strips are provided with an inherent bias for establishing said biasing force effective at the minimum value of said output signal.

7. A transmitting device as claimed in claim 6 wherein a restoring beam is positioned in parallel relationship with said force balance beam and provided with an adjustable fulcrum for engagement with said force balance beam, said expansible element being connected to said restoring beam to apply said restoring force to said force balance beam through said fulcrum.

8. A transmitting device as claimed in claim 7 wherein said restoring beam is of generally channel shape construction and said adjustable fulcrum is threaded on an elongated shaft extending through said restoring beam.

9. A transmitting device, comprising, a force balance beam, a pivotal support for said beam, means responsive to the magnitude of a variable for effecting pivotal displacement of said force balance beam, means responsive to said displacement for establishing an output signal, a restoring beam positioned in parallel spaced relationship with said force balance beam and pivoted at one end thereof, an elongated shaft carried by said restoring beam and supported at each end thereof on said restoring beam for rotation relative thereto, said shaft having a medial externally threaded portion, a movable fulcrum engaging said force balance beam and threaded on said threaded portion of said elongated shaft for movement relative to said restoring beam and said force balance beam upon rotation of said shaft, and means responsive to said output signal engaging said restoring beam for applying a restoring force to said force balance beam at the point of engagement of said fulcrum with said force balance beam.

10. A transmitting device as claimed in claim 9 wherein said restoring beam comprises an elongated channel shaped member having the ends of said shaft rotatably mounted in the opposite ends thereof.

11. A transmitting device comprising, a casing, a pressure sensitive diaphragm unit mounted in said casing, means for applying a pressure differential across said diaphragm unit representative of a flow rate, sealing means closing one end of said casing, a force balance beam pivoted on said sealing means and extending into said casing for operative connection with said diaphragm to be deflected thereby, said force balance beam having an offset portion on the exterior side of said sealing means which has the surface thereof in line with the longitudinal axis of the interior portion within said casing and said sealing means, means responsive to deflection of said force balance beam for establishing an output signal having a predetermined range of magnitudes, a restoring beam positioned in parallel spaced relationship with said offset portion of said force balance beam and having a pivot axis intersected by the longitudinal axis of said interior portion, an adjustable fulcrum carried by said restoring beam engageable with said surface of said offset portion, and means responsive to said output signal for applying a force to said restoring beam to apply a balancing force to said force balance beam at the position of said adjustable fulcrum.

12. A transmitting device as claimed in claim 11 wherein a pair of flexure strips are positioned on opposite sides of said force balance beam in line with said longitudinal axis of said interior portion, said flexure strips being fixed at one end to the exterior end of said force balance beam and at the other end thereof to said casing to restrain said force balance beam against axial movement under the influence of pressure within said casing.

13. A device responsive to a differential pressure, comprising, a two part casing, a circular plate having a central bore extending therethrough clamped between said casing parts and having curved concave surfaces on the opposite sides thereof, a pair of thin flat metal circular diaphragms fixed at their peripheries to opposite sides of said plate to define a sealed unit, an incompressible fluid filling the interior of said unit, reinforcing plates fixed to said diaphragms and received in complemented recesses within said circular plate, and an operative connection between said reinforcing plates to effect deflection of said diaphragm plates as a unit in response to a pressure difference between opposite sides of said sealed unit.

14. A transmitting device, comprising, a casing, a force balance beam pivoted on said casing, means responsive to the magnitude of a variable for effecting pivotal displacement of said force balance beam, means responsive to said displacement for establishing an output pneumatic signal, a mounting frame extending from said casing, a restoring beam positioned in parallel spaced relationship with said force balance beam and pivoted at one end thereof on said mounting frame, a U-shaped member clamped to said force balance beam and encircling said restoring beam, an adjustable fulcrum mounted on said restoring beam for engagement with said force balance beam, an expansible element having one end thereof fixed to said frame and the other end thereof connected to said restoring beam, said expansible element being connected in communication with said output signal for applying a restoring force to said force balance beam at the position of said adjustable fulcrum, means for adjusting the position of said fulcrum to vary the range of said output signal, and a spring adjustably mounted in compression between said frame and said U-shaped member for biasing said force balance beam to suppress the range of said output signal.

15. A transmitting device as claimed in claim 14 wherein a spring having tension and compression adjustability is mounted between said frame and said restoring beam for calibrating said output signal.

16. A transmitting device, comprising, a casing, a pressure sensitive diaphragm unit mounted in said casing comprising a pair of thin flat metal diaphragms sealed on opposite sides of a back-up plate and movable as a unit relative thereto, means for applying a pressure differential across said diaphragm unit representative of a flow rate, a force balance beam pivoted on said casing and having one end thereof operatively connected to said diaphragm unit to be deflected thereby, a fluid pressure couple effective upon displacement of said force balance beam to establish a couple output pressure, a pneumatic amplifier having reset action responsive to said couple output pressure for establishing an amplified pneumatic output pressure signal, and means responsive to said amplified output signal for applying a restoring force to said force balance beam.

17. A device responsive to a differential pressure, comprising, a casing, a circular plate mounted in said casing, a pair of flat metal circular diaphragms sealed at their peripheries to opposite sides of said plate, and an operative connection between the medial portions of said diaphragms to effect deflection of said diaphragms as a unit relative to said plate in response to differential pressure variations in said casing, said diaphragms being engageable with opposite sides of said plate during excess pressure differential conditions in said casing.

18. A device responsive to a differential pressure, comprising, a casing, a circular plate mounted in said casing, a pair of flat metal circular diaphragms sealed at their peripheries to opposite sides of said plate to define a sealed unit, an incompressible fluid filling the interior of said unit, and an operative connection between the medial portions of said diaphragms to effect deflection of said diaphragms as a unit relative to said plate in response to variations in differential pressure within said casing, said diaphragms being engageable with opposite sides of said plate during excess pressure differential conditions in said casing.

19. A transmitting device, comprising, a casing, a pressure sensitive diaphragm unit mounted in said casing comprising a pair of thin, flat, metal diaphragms sealed on opposite sides of a backup plate and movable as a unit relative thereto in a small range of movement, a fluid pressure couple operatively connected to said diaphragm unit to be displaced thereby to establish a couple output pressure, and a pneumatic amplifier having reset action responsive to small variations in said couple output pressure for establishing a pneumatic control signal.

20. A transmitting device, comprising, a casing, a circular plate mounted in said casing, a pair of flat, metal, circular diaphragms sealed at their peripheries to opposite sides of said plate, an operative connection between the medial portions of said diaphragms to effect deflection of said diaphragms as a unit relative to said plate in response to variations in the difference in pressures acting on the nonadjacent sides of said diaphragms, a pneumatic amplifier having reset action mounted on said casing and responsive to an input signal pressure to establish an amplified output signal pressure, and means responsive to deflection of said diaphragm unit for establishing an input signal pressure to said amplifier.

21. A transmitting device as claimed in claim 20 wherein said diaphragms are sealed to opposite sides of said plate to provide a sealed unit and an incompressible fluid fills the interior of said sealed unit.

22. A transmitting device, comprising, a casing, a pressure sensitive diaphragm unit mounted in said casing, means for applying a pressure differential across the diaphragm unit representative of a flow rate, sealing means closing one end of said casing, a force balance beam pivoted on said sealing means extending into said casing for operative connection to said diaphragm unit to be deflected thereby, a nozzle and baffle fluid pressure couple cooperative with the other end of said force balance beam to undergo a variation in output upon deflection of said beam, a mechanism frame extending from said casing and surrounding said force balance beam, a restoring beam pivotally mounted on said mechanism frame and having an adjustable fulcrum engagable with said force balance beam, means responsive to the output of said fluid pressure couple to establish a pneumatic output signal, a first detachable supporting plate adapted to be detachably mounted on said mechanism frame, an expansible element mounted on said first plate and having one end thereof engaging said restoring beam when said first plate is mounted on said mechanism frame, said expansible element being connected in communication with said output signal to apply a restoring force to said force balance beam, a second detachable supporting plate adapted to be detachably mounted on said mechanism frame in place of said first plate and said expansible element, and a square root extracting mechanism adapted to be responsive to said output signal mounted on said second plate, and means connecting said square root extracting mechanism to said restoring means upon attachment of said second plate to said mechanism frame to apply a restoring force to said force balance beam.

References Cited in the file of this patent

UNITED STATES PATENTS

| | | |
|---|---|---|
| 1,887,322 | Nettleton | Nov. 8, 1932 |
| 2,240,243 | Mason | Apr. 29, 1941 |
| 2,298,112 | Edwards et al. | Oct. 6, 1942 |
| 2,354,423 | Rosenberger | July 25, 1944 |
| 2,408,685 | Rosenberger | Oct. 1, 1946 |
| 2,658,392 | Vannah | Nov. 10, 1953 |
| 2,806,480 | Bowditch | Sept. 17, 1957 |
| 2,808,725 | Booth et al. | Oct. 8, 1957 |
| 2,851,048 | Hutchinson | Sept. 9, 1958 |